SEMICONDUCTOR RECTIFIER ASSEMBLY

Original Filed Sept. 2, 1966

INVENTOR:
FREDERICK R. SIAS,
BY Albert S. Richardson Jr.
ATTORNEY

Oct. 7, 1969 F. R. SIAS 3,471,757
SEMICONDUCTOR RECTIFIER ASSEMBLY
Original Filed Sept. 2, 1966 5 Sheets-Sheet 2

INVENTOR:
FREDERICK R. SIAS,
BY Albert S. Richardson Jr.
ATTORNEY

INVENTOR:
FREDERICK R. SIAS,
BY Albert S. Richardson Jr.
ATTORNEY

Oct. 7, 1969 F. R. SIAS 3,471,757
SEMICONDUCTOR RECTIFIER ASSEMBLY
Original Filed Sept. 2, 1966 5 Sheets-Sheet 4
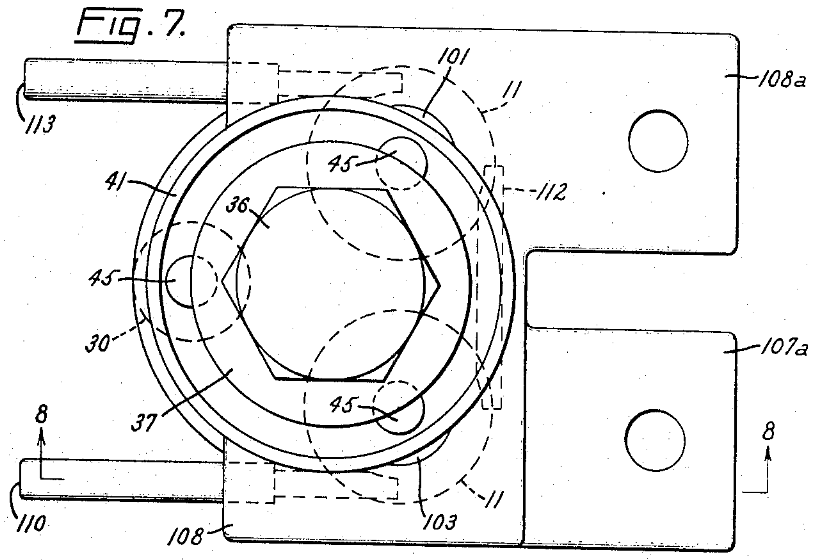
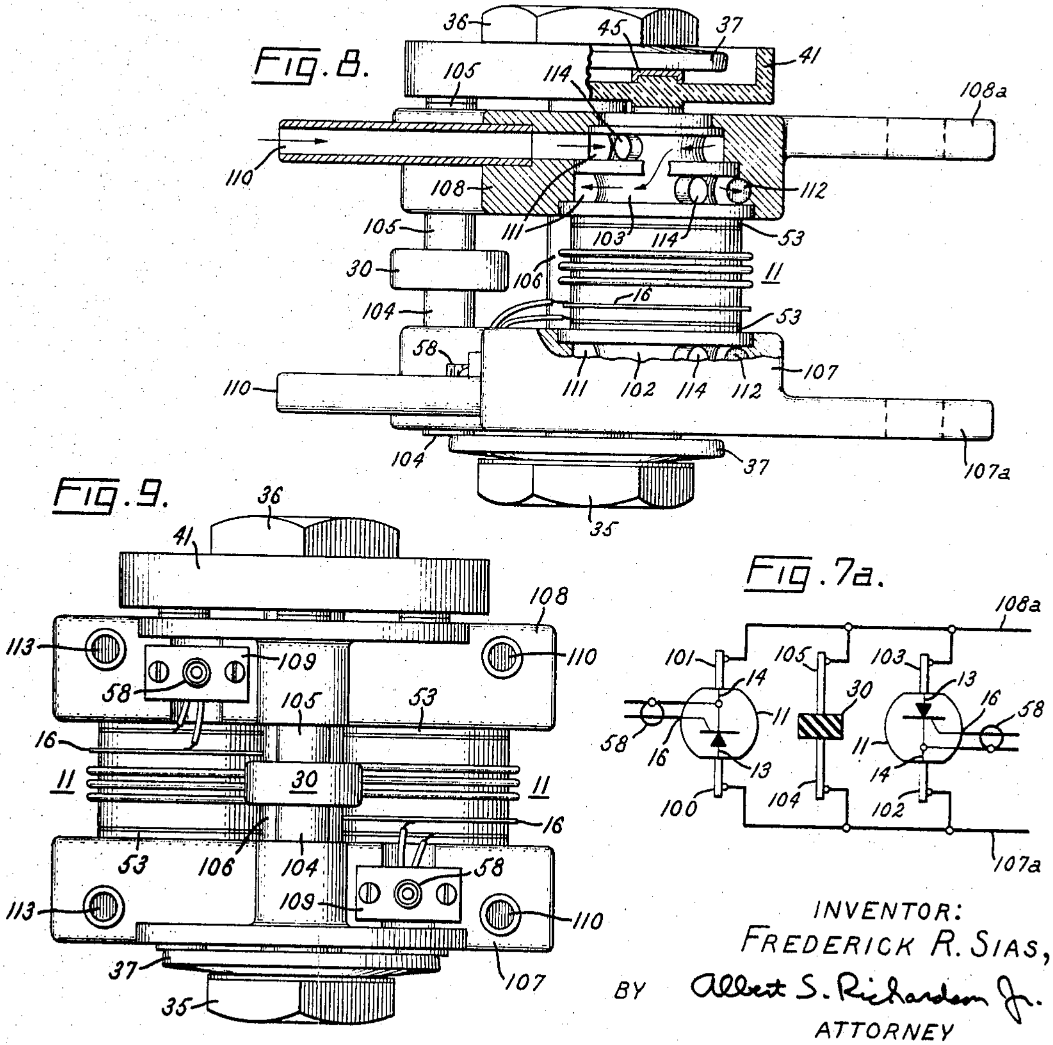
FIG. 8, FIG. 9, FIG. 7a
INVENTOR:
FREDERICK R. SIAS,
BY Albert S. Richardson Jr.
ATTORNEY INVENTOR:
FREDERICK R. SIAS,
BY Albert S. Richardson Jr.
ATTORNEY

United States Patent Office 3,471,757

Patented Oct. 7, 1969

3,471,757

SEMICONDUCTOR RECTIFIER ASSEMBLY

Frederick R. Sias, Wallingford, Pa., assignor to General Electric Company, a corporation of New York Continuation of application Ser. No. 577,034, Sept. 2, 1966. This application Sept. 25, 1968, Ser. No. 768,605

Int. Cl. H01l 3/00, 5/00

U.S. Cl. 317—234 32 Claims

ABSTRACT OF THE DISCLOSURE

A semiconductor rectifier assembly comprising a plurality of parallel sets of spaced-apart metal posts all of which are axially compressed by means of a common, central tie bolt in tension, which at least one sealed semiconductor device being clamped between opposing posts of at least one set.

This application is a continuation of application S.N. 577,034, filed Sept. 2, 1966, now abandoned.

This invention relates to semiconductor rectifier assemblies, and more particularly it relates to such assemblies wherein a plurality of high-current semiconductor devices are jointly mounted in compression.

Various techniques have heretofore been proposed for mounting broad-area high-current semiconductor rectifiers under high pressure. In one prior scheme the requisite pressure is obtained by spring means located inside the hermetically sealed housing in which the semiconductor element is contained, but this scheme presents undesirable problems with respect to efficiently cooling the element and with respect to joining multiple elements in a common assembly. According to another prior scheme, the element is sandwiched between massive, electroconductive cooling bodies clamped together by means of two or more tie bolts that extend between flanges on the respective bodies, but this scheme presents undesirable problems with respect to paralleling elements and with respect to obtaining an even distribution of pressure over the whole area of each element. Accordingly, one of my general objectives is to provide improved pressure assemblies of high-current semiconductor devices in which the shortcomings of the prior art are substantially avoided.

Another general object of the present invention is the provision of a stable high pressure assembly in which a plurality of individual semiconductor rectifier devices are tightly and uniformly compressed between thrust members that are good conductors of both heat and electric current.

An additional object is the provision of such an assembly characterized by the relative convenience and economy with which failed devices can be removed and replaced.

Still another object is the provision of such an assembly characterized by the unusual versatility and flexibility with which its basic parts can be used to accomodate one or more devices in many permutations, whereby a variety of alternative circuit arrangements can be formed with essentially the same standardized parts and devices.

The following are representative examples of typical arrangements that have been obtained in assemblies embodying my invention:

(1) A "super-current" diode comprising four semiconductor devices in parallel, the assembly being forced-air cooled and rated 2,500 amperes (average forward current), 2,200 volts (peak reverse voltage), (2) A high-voltage thyristor stack comprising two devices in series, the assembly being rated 420 amperes (average), 3,600 volts (PRV), and (3) An A-C switch (water cooled) comprising a pair of inverse-parallel devices rated 1,200 amperes (RMS), 1,800 volts (PRV).

In carrying out my invention in one form, I provide three (or more) sets of axially aligned, spaced-apart metal posts, and I locate these sets in a symmetrical pattern with their respective axes parallel to each other. The posts of at least one of the sets are made of copper or equivalent, and a broad-area high-current semiconductor rectifier device is disposed mechanically between and electrically in series with these posts. I also dispose interconnection means between the respective posts of each of the other sets of posts, which means can comprise either insulating spacers or additional semiconductor devices as desired. In order to obtain good thermal and electrical contact between the copper posts and the device that is disposed therebetween, all of the posts are interconnected and axially compressed by a single tension member whose longitudinal axis extends parallel to and is centered with respect to the axes of the three sets of posts. Opposite ends of the tension member are mechanically connected to the respective posts of each set, and electric insulation means is provided to prevent short-circuiting of the copper posts by the tension member.

Several refinements of this basic assembly are contemplated. For example, for the purpose of connecting the semiconductor device to an external electric circuit, first and second conductors are connected to the copper posts, respectively, and these conductors can be used for mechanically mounting the assembly. In order to enhance the cooling of the device, each of the copper posts can be equipped with heat dissipating means, such as a plurality of spaced metal cooling fins.

Preferably the semiconductor device comprises a broad area semiconductor (silicon) wafer sandwiched between a pair of flat electrodes that are disposed at opposite sides of an hermetically sealed housing, and these electrodes are respectively in contact with the adjoining copper posts. For this purpose opposing ends of the copper posts are terminated by conforming flat and parallel contact surfaces. Due to the axial compression of the posts by the aforesaid tension member, the electrodes of the semiconductor device are clamped under high pressure between these contact surfaces. The requisite axial thrust can best be transmitted to the posts by including at least one Belleville spring washer in the connection between a first end of the tension member and a coresponding end of one of the posts of each of the three sets of posts. To promote equal and uniform distribution of contact pressure, I use a washer whose crown is fastened to the first end of the tension member and whose rim overlays the axial centers of the respective sets of posts.

The assembly summarized above has a number of important advantages. The single tension member extending centrally among a plurality of parallel sets of posts enables axial thrust to be applied in equal measure to the respective sets without complicated or precise adjustments, and the spring washer enables the thrust applied to each set of copper posts to be centered with respect to the flat, parallel contact surfaces at opposing ends thereof, thereby avoiding or at least minimizing any tendency to unevenly or eccentrically clamp the semiconductor device between these surfaces. While relatively simple to manufacture, the assembly is nevertheless mechanically rugged and highly stable, whereby uniform, undistorted high pressure will be maintained on the semiconductor device even though the assembly is rougly handled or laterally loaded or subjected to extreme temperature cycling. Those skilled in the art will appreciate that the uniform application of high contact pressure over substantially the whole area of the semiconductor wafer is of utmost importance in obtaining the highest current capabilities of the individual device.

The addition of heat dissipating means to each of the copper posts will enable the individual semiconductor device to conduct more current safely. If an even higher current rating is desired, several duplicate semiconductor devices can be successfully paralleled in the same assembly (one device per set of copper posts). A pair of thyristors in parallel can be inversely poled with respect to each other to form an A-C switch. Furthermore, my basic assembly can easily accommodate two or more semiconductor devices in series by providing, in spaced alignment with the copper posts of at least one of the sets of posts, at least one additional copper post. This modification, which is fully described hereinafter, makes it possible to increase the voltage rating of the assembly or to combine devices in various circuit configurations.

My invention will be better understood and its various objects and advantages will be more fully appreciated from the following description taken in conjunction with the accompanying drawings, in which:

FIG. 1 is a plan view of a semiconductor rectifier assembly embodying my invention;

FIG. 1*a* is a hybrid electrical-mechanical schematic diagram of the FIG. 1 assembly;

Figure 4:
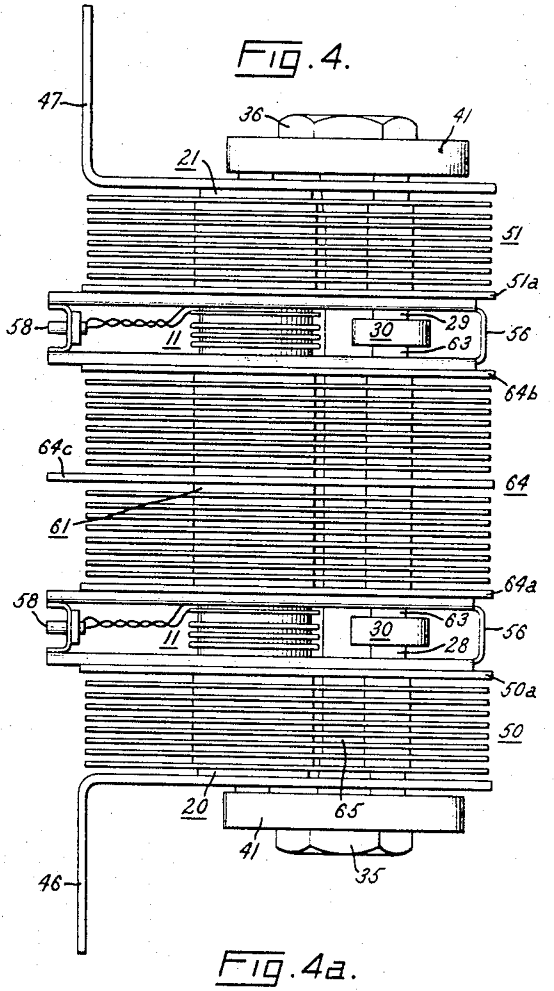
FIG. 4 is a front elevation of a second embodiment of my invention, wherein two semiconductor devices are serially connected in a common assembly.
Figure 4A:
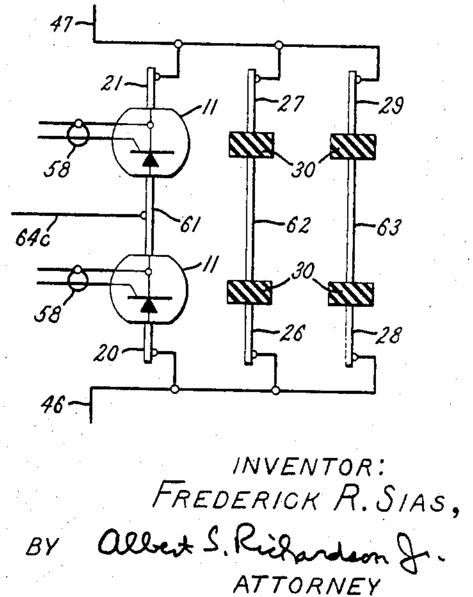
Figure 5:
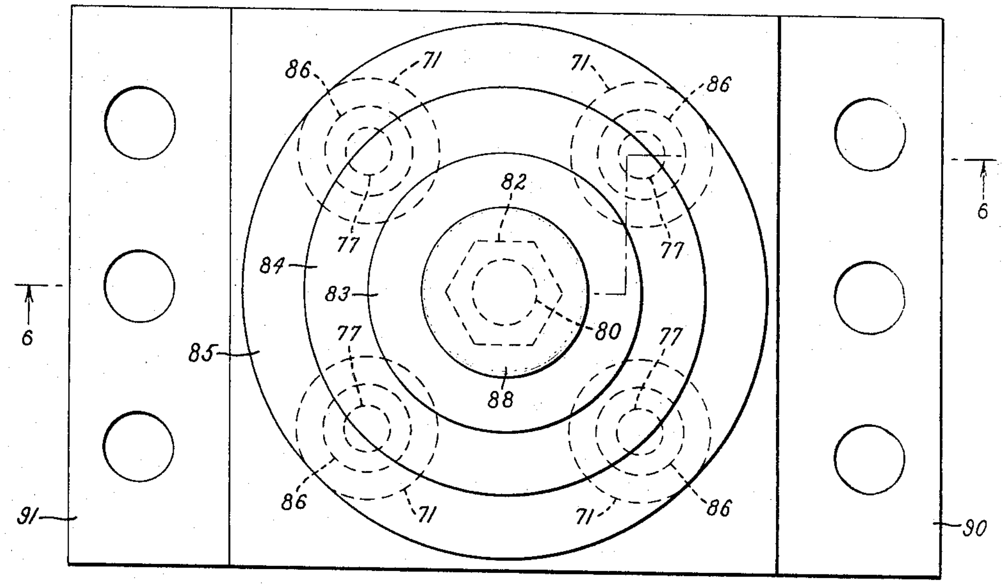
Figures 5A, 6:
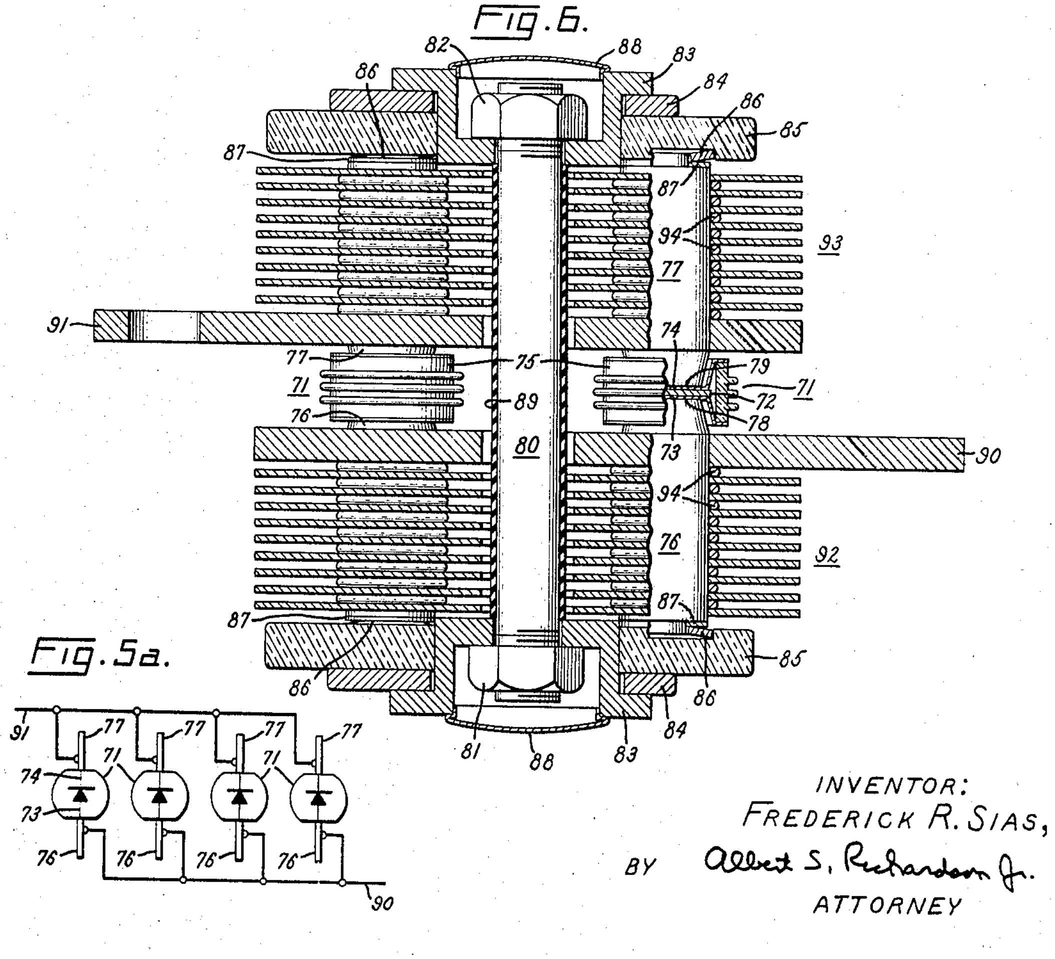

FIG. 4*a* is a hybrid electrical-mechanical schematic diagram of the FIG. 4 assembly;

FIG. 5 is a plan view of a third embodiment of my invention, wherein four semiconductor devices are assembled in parallel;

FIG. 5*a* is a hybrid electrical-mechanical schematic diagram of the FIG. 5 assembly;

FIG. 6 is a sectional view taken along line 6—6 of FIG. 5;

FIG. 7 is a plan view of a fourth embodiment of my invention, wherein a pair of inverse-parallel semiconductor devices are jointly mounted in a water cooled assembly;

FIG. 7*a* is a hybrid electrical-mechanical schematic diagram of the FIG. 7 assembly;

FIG. 8 is a partial sectional view taken along the lines 8—8 of FIG. 7;

FIG. 9 is left-side elevation of the assembly shown in FIG. 7; and

FIGS. 10*a* through 10*e* are hybrid electrical-mechanical schematic diagrams of various other embodiments of my invention.

Figures 1, 1A, 2:
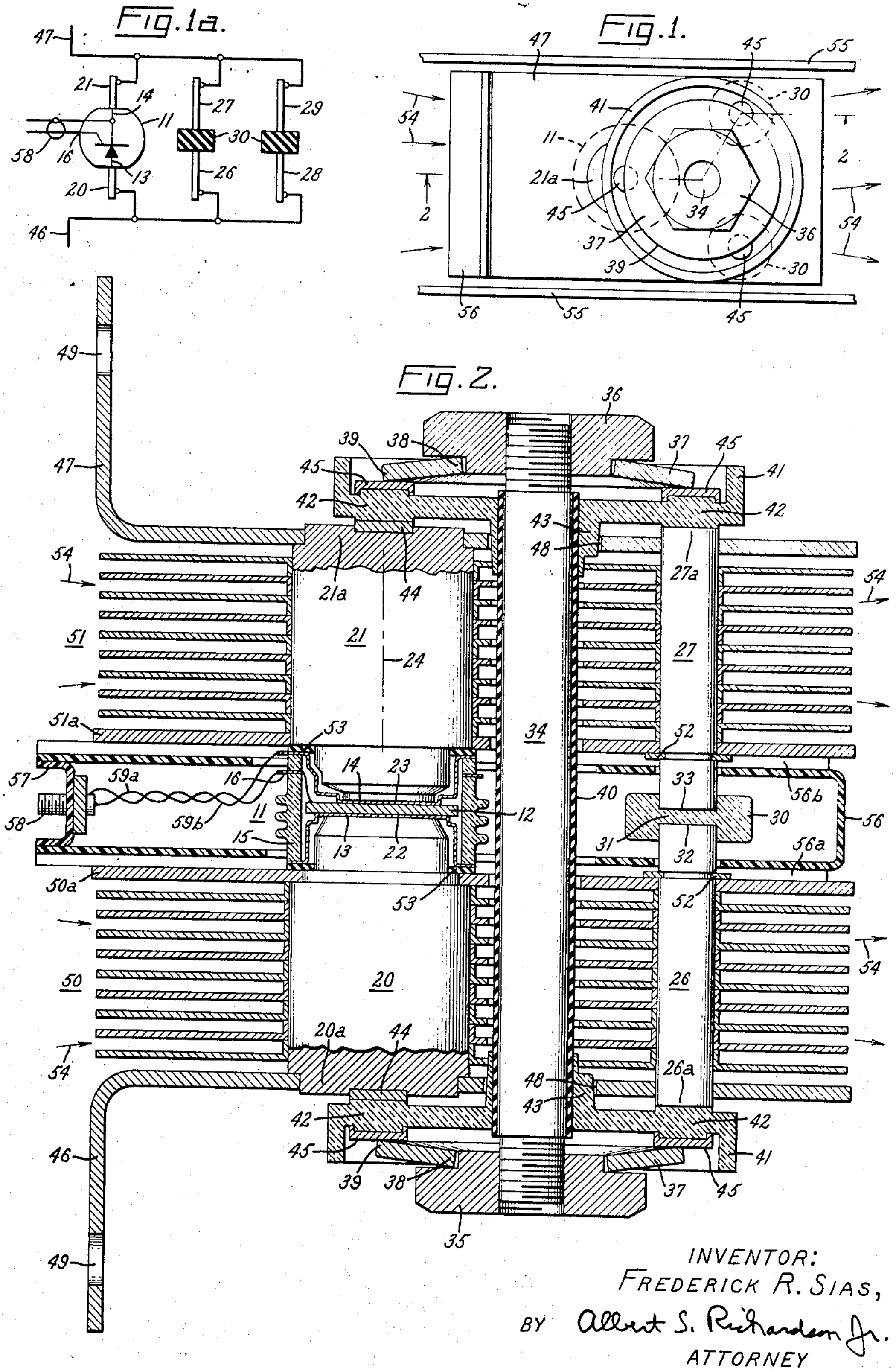
FIG. 2 is an enlarged sectional view taken through lines 2—2 of FIG. 1.
Figure 3:
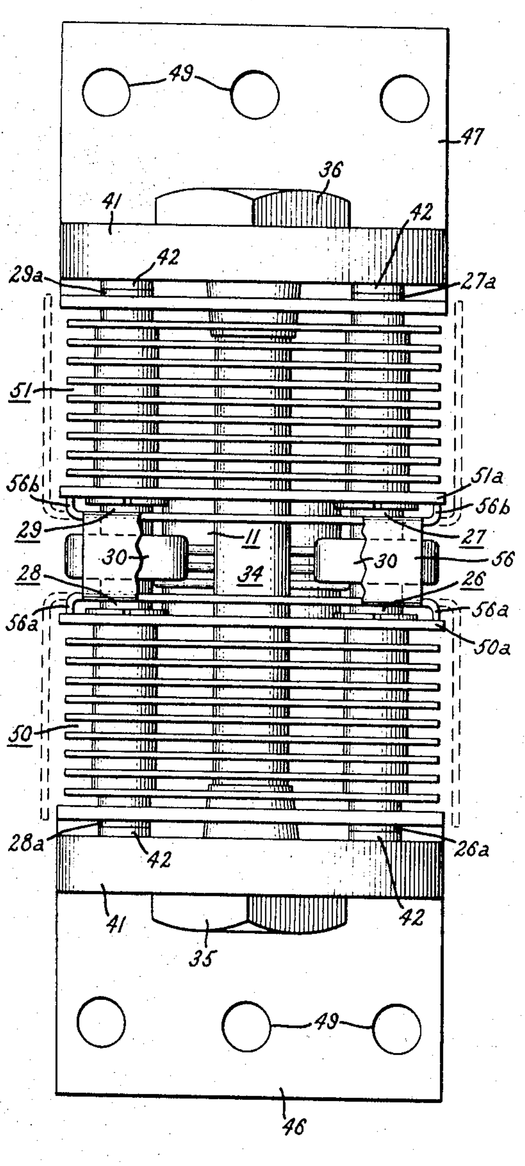
FIG. 3 is a side elevation of the assembly shown in section in FIG. 1.

I will first describe the embodiment of my invention that is illustrated in FIGS. 1, 1*a*, 2, and 3. In this particular assembly I mount only one high-current semiconductor rectifier device 11. The device 11, best seen in cross section in FIG. 2, comprises a disc-like wafer 12 sandwiched between the flat bottoms 13 and 14 of a pair of cup-shaped terminal members whose rims are bonded to opposite ends of a ceramic sleeve 15 to form an integral, hermetically sealed housing for the wafer 12. The sidewalls of the cup-shaped terminal members are made of ductile metal, such as copper, and the bottoms 13 and 14 are the main electrodes of the device (hereinafter referred to as anode and cathode, respectively). The disc-like wafer 12 comprises a thin, relatively broad area slice of semiconductor material, such as silicon, having metal faces that preferably are truly flat and parallel to each other. A typical wafer diameter is 1.25 inches, and the diameter of the cup-shaped terminal members of the device is approximately the same. Internally the wafer 12 has at least one PN rectifying junction generally parallel to its faces. The semiconductor device shown in FIGS. 1–3 is actually a thyristor (i.e., a controlled rectifier), and its wafer is therefore characterized by four layers of silicon of alternately P and N type conductivity, one of which has a gate contact connected peripherally thereto. For the purpose of connecting an external gate lead to this gate contact, the ceramic sleeve 15 includes a ring-shape gate electrode 16 as shown.

The device 11 is disposed mechanically between and connected electrically in series with a pair of aligned thrust members or posts 20 and 21 that serve as combined electrical and thermal conductors. Toward this end the posts 20 and 21 are made of highly conductive metal, preferably copper, having a circular cross section whose diameter is normally greater than that of the semiconductor wafer 12. Opposing ends of these copper posts are tapered to fit freely inside the cup-shaped terminal members of the device 11 where they are terminated by spaced-apart flat contact surfaces 22 and 23, respectively. The facing contact surfaces 22 and 23 are both intersected at right angles by the common longitudinal centerline or axis 24 of the posts 20 and 21, and they are designed to be substantially parallel to and to conform generally to the shape of the external contact surfaces of the anode 13 and the cathode 14 that they respectively adjoin. Consequently the surface 22 is contiguous with the anode 13 over a broad area, and the surface 23 is contiguous with the cathode 14 over a broad area.

The anode and cathode of the semiconductor device 11 and the respective copper posts 20 and 21 are conductively coupled by pressing their contiguous contact surfaces together under high pressure. This is accomplished by axially compressing the posts. No solder or other means is used for bonding these parts together, and the posts are completely separable from the device. Nevertheless, good electrical and thermal conductivity at the junctions of these parts is obtained in my assembly by subjecting the copper posts to a high axial thrust (e.g. 2,000 pounds), and by distributing this force very evenly over a broad area.

To ensure an even distribution of contact pressure, I provide in parallel with the copper posts 20 and 21 two additional sets of spaced-apart axially aligned metal posts. The first and second posts of one of these sets has been identified by the reference numbers 26 and 27, respectively, and the corresponding posts of the other set (see FIG. 3) are identified 28 and 29. The posts 26–29 preferably comprise cylindrical iron or steel rods of a diameter appreciably smaller than that of the copper posts 20–21. Opposing ends of the aligned steel posts are terminated by flat surfaces that are normal to the axes of these posts.

As is shown in FIGS. 2 and 3, the respective posts of each of the additional sets are mechanically interconnected by means of a spacer 30 that is sandwiched between their opposing ends in mutual alignment therewith. Each spacer 30 is shaped like a wheel, with a relatively thick flange and a solid web 31 whose diameter is approximately the same as that of the adjoining posts. Thus the web 31 of a spacer 30 is axially compressed between the terminal surfaces 32 and 33 of the steel posts 26 and 27 so long as these posts are subjected to an axial thrust.

Each spacer 30 is made of rigid electrical insulating material such as ceramic, or molded glass-bonded mica sold under the trademark "Mycalex," and the combination of a spacer and its adjoining posts forms a strong pillar that is mechanically but not electrically disposed in parallel with the set of copper posts 20 and 21. The same result could be achieved by locating the insulating spacer at the end of a single long steel post or by interposing additional spacers and posts in mutual alignment with those illustrated, but the illustrated combination is preferred because it facilitates manufacturing and repairing of the rectifier assembly. The thick flange of the spacer 30 ensures that adequate air ("strike") and surface ("creep") distances are maintained between opposing ends of the steel posts. But I prefer to use spacers having webs of appropriate thinness so that the flat parallel terminal surfaces 32 and 33 of steel posts 26 and 27 will be spaced apart by a distance just equal to the gap between the facing contact surfaces 22 and 23 of the copper posts 20 and 21, whereby the surface 32 can be coplanar with the surface 22, and the surface 33 can be coplanar with the surface 23. In effect the spacer 30 is a "dummy" cell like the semiconductor device 11 except that it is an insulator instead of a unidirectional conductor. If no insulation were needed, a metal spacer could be used.

As is apparent in the drawings, I have located the three parallel sets of posts (20–21, 26–27, and 28–29) in a symmetrical pattern. All of the posts are subjected to axial thrust by means of a single tension member comprising an elongated steel tie bolt 34 extending parallel to the respective sets of aligned posts. As is best seen in FIGS. 2 and 3, a nut 35 on one end of this tie bolt is mechanically connected to corresponding ends **20*a*, 26*a*, and 28*a* of the posts 20, 26, and 28, and a second nut 36 on the other end of the bolt 34 is mechanically connected to the posts 21, 27, and 29 at their opposite ends 21*a*, 27*a*, and 29*a*, respectively. Consequently, on tightening nuts 35 and 36 the posts of each set are axially compressed, and the device 11 and spacers 30** are firmly clamped therebetween. In order to apply an equal amount of pressure to each of the three sets of posts, the longitudinal axis of the tie bolt is centered with respect to the axes of the respective sets.

In the illustrated embodiments of my invention, the connection between each end of the tie bolt 34 and the respective posts of the three sets of posts includes a resilient Belleville spring washer 37. As shown in FIG. 2, each washer 37 has a crown 38 that is fastened to the tie bolt by way of the associated nut 35/36, and its rim 39 overlays the axial centers of the corresponding ends of the posts. In this manner the pressure applied to the set of copper posts 20 and 21 is axially centered, whereby I avoid any moment that would tend to tilt the posts and thereby impair the even distribution of pressure over the whole area of contact surfaces 22 and 23. The same result could be achieved by other means, such as individual Belleville washers on each post (see the description of FIG. 6 hereinafter), or a ball and socket type of connection along the axis of a post.

In order to prevent short-circuiting of the copper posts 20 and 21 by the tie bolt 34, the bolt is covered by an insulating sleeve 40 and a layer of electric insulating material is interposed between at least one of the washers 37 and each of the post ends adjacent thereto. Preferably the latter insulation is in the form of a collar 41 of "Mycalex" having a central opening through which the tie bolt extends. At equiangular positions near its periphery the collar 41 is axially thickened to form three bosses 42 whose individual diameter equals that of the steel posts 26–29. The bosses 42 are axially centered over the adjacent posts as shown. The copper posts 20 and 21 have steel bearing inserts 44 of equal diameter protruding from their opposite ends **20*a* and 21*a*. Each of the three bosses 42 of the insulating collar 41 has a hard metal cap 45 positioned thereon, and the rim 39 of the washer 37** bears against the flat exterior surface of these caps.

The spring washers 37 not only serve as mechanical levers to transmit load from the tie bolt 34 to the respective posts of my assembly, but in addition they provide a desirable amount of resiliency in the pressure applying mechanism. The latter function expedites the initial pressure adjustment and thereafter accommodates dimensional changes in the assembly (due to temperature changes or aging) without allowing contact pressure to deteriorate appreciably. I prefer to use spring washers whose full load rating is about 2.5 times the actual load imposed, whereby they are only partially deflected when installed in the rectifier assembly. Since the washers 37 are not pressed flat, only their rims 39 touch the caps 45 against which they bear, and the outside washer diameter is selected so that the resulting bearing lines will intersect respectively the extended axes of all three sets of posts 20–21, 26–27, and 28–29.

For the dual purposes of electrically connecting the semiconductor rectifier device 11 to an external electric circuit and of mechanically mounting the whole assembly, the copper posts 20 and 21 are furnished with appropriate takeoff means. As is shown in FIGS. 1–3, the takeoff means comprises a pair of terminal conductors 46 and 47 that preferably are L-shaped copper bars or buses respectively attached (by brazing or the like) to the outer ends **20*a* and 21*a* of the copper posts. For added strength and rigidity, the terminal conductor 46 is also attached to the outer ends 26*a* and 28*a* of one of the posts of each of the two sets of steel posts, and the terminal conductor 47 is similarly attached to the outer ends 27*a* and 29*a* of the other posts of the latter sets. In each conductor there is a central opening to receive the tie bolt 34 which is there embraced by the insulating sleeve 40 and an annular neck of one of the insulating collars 41, and an eccentric notch 48 is provided in the perimeter of this opening to singularly locate a key 43 that protrudes radially from the collar neck for the purpose of angularly positioning the collar 41 so that its bosses 42 line up with the respective sets of posts. The distal ends of the conductors 46 and 47 are provided with holes 49** for bolting the assembly to suitable electroconductive support members, not shown.

It will now be apparent that I have provided a balanced pressure applying arrangement for a semiconductor device 11 wherein the contact surfaces 22 and 23 of two copper posts 20 and 21 are tightly clamped against the external contact surfaces, respectively, of the anode 13 and the cathode 14 of the device. This assembly is characterized by four important advantages that will now be summarized.

Mechanically the assembly is very stable. High contact pressure will be maintained on the semiconductor device for many years of service and in spite of wide variations in temperature. The tripodal post arrangement effectively prevents or minimizes any undesirable bending of the aligned copper posts 20 and 21 and distortion of the compressed contact surfaces in the event the assembly is roughly handled by the user or subjected to lateral loading when mounted.

The assembly is relatively simple to manufacture. To ensure that the requisite high contact pressure is uniformly applied over a broad area of the high-current semiconductor device, only a single uncomplicated adjustment is necessary, namely, turning one of the nuts 35/36 on the tie bolt 34. The resulting thrust on the set of copper posts 20–21 is centered axially, whereby a parallel, even contact over the whole area of the contiguous contact surfaces is assured even if the spring washer 37 is loaded eccentrically by the nut. Nevertheless, to minimize the latter possibility, the crown 38 of each spring washer is ground flat so as to engage the overlying nut continuously around its perimeter.

In service the assembly is relatively easy to repair. The device 11 is not permanently connected to the other parts of the assembly and hence is readily removable therefrom. By simply removing one of the nuts from the tie bolt the copper posts 20 and 21 can be immediately separated and a failed device can be replaced by a new one.

In view of its high current and voltage capabilities, my assembly is relatively compact. The space around the two sets of steel posts 26–27 and 28–29 is advantageously occupied by heat dissipating means for enhancing the cooling of both of the copper posts 20–21. Those skilled in the art are aware that the current-carrying capacity of a semiconductor device is determined principally by the success with which heat is removed from its internal PN rectifying junctions. Cooling both sides of the device is especially desirable where a high surge current rating is needed, and my assembly is admirably adapted for this purpose.

The two copper posts 20 and 21 of my assembly serve not only as mechanical supports and electrical contacts but also as thermal heat sinks for the semiconductor device 11. In order to promote the dissipation of heat from these posts in the FIGS. 1–3 embodiment of my invention, they have been equipped, respectively, with two groups 50 and 51 of spaced metal cooling fins. The fins in each group comprise thin copper plates oriented perpendicular to the axis of the associated copper post, to which they are attached by brazing or the like. Each fin has appropriate holes through which the companion steel posts and the tie bolt of the assembly extend.

The first cooling fin 50*a*/51*a* on the inner end of each group 50/51 is made thicker and hence stronger than the remaining fins, and its length and width are also slightly greater. The plane dimensions of the terminal conductors 46 and 47 are the same as those of the first fins 50*a* and 51*a*. Consequently, whenever the assembly is resting on its front, back, or side on a bench, its weight is supported by these four relatively rigid members. For added strength and rigidity, the fin 50*a* is brazed to the steel posts 26 and 28 and the fin 51*a* is similarly anchored to the steel posts 27 and 29. Split rings 52 are used to properly position these fins on the steel posts during the brazing process.

The first fins 50*a* and 51*a* have the severest cooling duty and are located as close to the semiconductor device 11 as possible. But to avoid interfering with obtaining high contact pressure on the anode 13 and cathode 14 of the device, neither these fins nor the copper posts are permitted to rest immediately against the device 11 in the vicinity of its ceramic sleeve 15. In the small gaps that result at opposite ends of the sleeve 15, I prefer to locate washers 53 of yieldable material such as silicone rubber, which washers help mechanically to stabilize the sleeve 15 and to prevent dust and other contaminators from entering the space around the tapered ends of the copper posts.

Heat is removed from both sides of the semiconductor wafer 12 in the device 11 by way of the two copper posts 20 and 21 and their associated groups 50 and 51 of cooling fins. The efficiency of this process is improved by forcing air to flow over the large surface area of the cooling fins. Such air flow is represented in FIGS. 1 and 2 by the arrows 54. The assembly will ordinarily be mounted between the walls 55 of an air duct that channels the cooling air therethrough. The length of the copper posts 20 and 21 is primarily dictated by the number and size of the cooling fins and the interfin spacings that must be used to achieve prerequisite cooling of the semiconductor device with a given rate of air flow without exceeding a given drop in air pressure. Thus, by refrigerating the air (or, alternatively, by reducing the cooling requirements) it is possible to shorten the copper posts to mere stubs.

In order to avoid the inefficient diversion of cooling air through the wide space that is adjacent to the ceramic sleeve 15 of the device 11, a baffle 56 is installed between the two groups 50 and 51 of cooling fins. Preferably, as can be seen in FIGS. 2 and 3, the baffle 56 comprises a long U-shaped sheet of insulating material, and along the sides of the sheet there are outwardly turned projections or strips 56*a* and 56*b* that abut the facing surfaces of the first cooling fins 50*a* and 51*a*, respectively, whereby channels are formed for the passage of air between the baffle and these surfaces. Thus the closed end of the baffle 56 blocks air circulation in a space between but not contiguous to the fin groups 50 and 51, and it is in this dead air space that the semiconductor device 11 is located.

The open end of the U-shaped baffle 56 is spanned by a short U-shaped member 57 of insulating material that provides a convenient base for a coaxial connector 58 for the gate lead 59*a* that is connected to the gate electrode 16 (where used) of the device 11. As is shown in FIG. 2, the shell of the connector 58 is connected to the cathode 14 of the device 11 by another lead 59*b* which is twisted with the lead 59*a*. The ends of the baffle 56 protrude far enough to ensure that adequate surface (creep) distance is maintained between the connector shell (which is a cathode potential) and the nearest edge of the first cooling fin 50*a* (which is at anode potential).

FIG. 3 illustrates by broken lines how the sides of the baffle 56 could be extended and bent along the front and rear of the fin groups to form a self-contained air duct for the flow of cooling air, in lieu of the external walls 55 shown in FIG. 1. Alternatively, the same result could be obtained by bending the front and rear edges of the individual cooling fins of groups 50 and 51.

The embodiment of my invention illustrated in FIGS. 1–3 has now been fully described. In effect the semiconductor device 11 and the two parallel insulating spacers 30 are disposed in compression between two subassemblies that are separably clamped together by means of the central tie bolt 34. Each subassembly comprises the integral combination of a copper post in parallel with two steel posts, a terminal conductor connected to all three posts, and a group of spaced cooling fins radiating from the copper posts. After each subassembly is complete but before it is joined to the companion subassembly, the coplanar surfaces 22 and 32 (or 23 and 33) that terminate the inner ends of the respective posts are preferably ground and lapped, so that they are truly flat and perpendicular to the axis 24 of the copper post. Similarly, the outer ends 26*a* and 28*a* (or 27*a* and 29*a*) of the steel posts and the exterior flat surface of the steel insert 44 in the copper post are ground in a common plane that is perpendicular to the axis 24. When finally assembled, the requisite axial thrust is transmitted to the set of copper posts 20 and 21, between which the main electrodes of the device 11 are compressed, by turning one of the nuts 35/36 until the tie bolt is stressed in tension by a force three times as great. One third of this load is transmitted by the washer 37 to each of the three parallel sets of posts. The specified load has been obtained in practice by turning the nut 1⅙ revolutions from a finger-tight position.

FIGS. 4 and 4*a* illustrate a second embodiment of my invention, wherein two semiconductor rectifier devices 11 (thyristors) are serially connected in a common assembly. Many parts of this asembly are essentially the same as those used in my first embodiment described hereinbefore, and therefore like reference characters are used where appropriate. Thus in FIGS. 4 and 4*a* it is apparent that the two integral subassemblies previously described have been repeated. In addition, between these subassemblies I have inserted an intermediate or third subassembly which will not be described.

The intermediate subassembly comprises a thick copper post 61, two parallel steel posts 62 and 63 of equal length, and a group 64 of spaced-apart thin metal cooling fins attached to the copper post 61. The first and last cooling fins 64*a* and 64*b* on opposite ends of the group 64 are larger than the remainder and are brazed to the steel posts 62 and 63 to form an integral subassembly. The additional copper post 61 is disposed in spaced, axial alignment between the copper posts 20 and 21 of the first and second subassemblies, thereby forming with the latter posts a set of three aligned thrust members. Similarly the steel post 62 is disposed in spaced, axial alignment with the set of aligned steel posts 26 and 27, and the steel post 63 is disposed in mutual alignment with the posts 28 and 29, whereby the two parallel sets of aligned steel posts comprise three posts each.

The upper end of the middle copper post 61, as viewed in FIG. 4, is tapered and terminated by a flat contact surface perpendicular to the common axis of the set of three copper posts 20–61–21. This contact surface is made the same as the contact surface 22 of post 20. The opposite end of the post 61 is also tapered and terminated by a flat contact surface normal to the common axis, and this surface duplicates the contact surface 23 of post 21. One semiconductor device 11 is sandwiched between the two posts 20 and 61 with its anode conductively coupled to the contact surface 22 of the former and its cathode conductively coupled to the opposing contact surface of the latter. A second semiconductor device 11 is sandwiched between the two posts 21 and 61 with its cathode conductively coupled to the contact surface 23 of the former and its anode conductively coupled to the opposing contact surface of the latter. In this manner I provide a stack of two devices 11 that are interconnected electrically in series with the copper posts 20 and 21 and hence in series with the terminal conductors 46 and 47 of the assembly. The PRV rating of such an assembly is relatively high, for example, 3,600 volts. Where an external electric connection to the common junction of the two devices is desired, one of the cooling fins of the intermediate group 64 can be extended as shown at 64*c*.

The gaps between opposing ends of the mutually aligned steel posts comprising the two sets 26–62–27 and 28–63–29 are respectively filled with rigid spacers 30 as before. Thus two spacers and a middle post 62/63 interconnect the end posts of each of these sets of steel posts. There is an elongated tie bolt 65 extending centrally between and parallel to the respective sets of copper and steel posts, and its opposite ends are connected to these posts by means of the nuts 35 and 36, the insulating collars 41 and the interposed Belleville washers, whereby all of the posts are axially compressed and the respective devices 11 and spacers 30 are firmly but separably clamped therebetween. With this arrangement it will be noted that the mechanical connection between the nut 35 and the middle copper post 61 is made by way of the companion post 20 and the first semiconductor device 11. To present the electrical potential of the tie bolt 65 from floating, a conductive clip (not shown) can be used to electrically interconnect the bolt 65 and the middle copper post 61.

As is shown in FIG. 4, the assembly includes an air baffle 56 between the two fin groups 50 and 64 and a duplicate baffle between the groups 51 and 64. The coaxial connectors 58 for the gate leads to the respective thyristors 11 are also shown. The complete assembly has all of the features and advantages explained hereinbefore in connection with the first embodiment of my invention. Obviously it is possible to modify the second embodiment by adding more intermediate subassemblies to form a stack of at least three serially connected semiconductor devices.

A third embodiment of my invention is illustrated in FIGS. 5, 5*a*, and 6. In this particular assembly I mount an array of four duplicate semiconductor diodes 71 in parallel with each other. Each of the devices 71, as is best seen in FIG. 6, comprises a disc-like semiconductor wafer 72 sandwiched between the flat bottoms 73 and 74 of a pair of cup-shaped terminal members whose rims are bonded to opposite ends of a ceramic sleeve 75 to form an integral, hermetically sealed housing for the wafer 72. Internally the wafer 72 has a single broad area PN rectifying junction generally parallel to its opposite faces, and the cup bottoms 73 and 74 serve as the main electrodes (anode and cathode, respectively) of the device.

Each device 71 is disposed mechanically between and is connected electrically in series with a different pair of aligned thrust members or copper posts 76 and 77 that serve as combined electrical and thermal conductors. The copper posts 76 and 77 have a circular cross section whose diameter is preferably greater than that of the semiconductor wafer 72. Their opposing ends are tapered to fit freely into the cup-shaped terminal members of the device 71 where they are terminated by facing contact surfaces 78 and 79, respectively. The contact surfaces 78 and 79 are made substantially parallel to and they generally conform to the shape of the external contact surfaces of the anode 73 and cathode 74, respectively.

To accommodate the four devices 71, I provide four parallel sets of axially aligned copper posts 76 and 77. As is indicated in FIG. 5, the four sets are located in a symmetrical pattern. All of the posts are axially compressed by means of a single tension member comprising a steel tie bolt 80 extending centrally among and parallel to the respective sets of posts. Opposite ends of the tie bolt are mechanically connected to the respective posts 76 and 77 of each set by means of a pair of nuts 81 and 82. The connection between each nut 81/82 and of the respective posts includes, in the named order, a cup-shaped metal collar 83, a relatively large Belleville spring washer 84, an insulating washer 85 of Mycalex or the like, one of four smaller Belleville spring washers 86 individually located on the copper posts, and one of four associated steel washers 87.

As is clearly seen in FIG. 6, the collars 83 are centrally depressed to enable the nuts 81 and 82 to be recessed in the assembly, and these depressions are covered by snugly fitting metal caps 88 for the sake of improved appearance. Each of the large spring washers 84 has an outside diameter approximately equal to the diameter of a circle intersecting the axes of all four sets of copper posts, and hence its rim overlays the axial centers of these sets. The spring washers 84 are pressed flat when assembled, and either one or both of them can be omitted if desired. The insulating washer 85, along with an insulating sleeve 89 on the tie bolt 80, prevents short circuiting of the copper posts 76 and 77 by the tie bolt.

The individual spring washers 86 provide the desirable resiliency in the pressure-applying mechanism. Each washer 86 is located on an axial protrusion of reduced diameter at the outer end of the associated copper post, with its crown bearing against a steel washer 87. The rim of 86 fits into a mated recess in the inner side of the insulating washer 85 as shown. With this arrangement substantially equal amounts of axially centered thrust will be transmitted to each of the four sets of copper posts 76–77 by the common tension member 80.

In FIGS. 5 and 6 the takeoff means for electrically connecting the four semiconductor devices 71 in parallel to an external high-current circuit is seen to comprise a pair of flat, rectangular terminal conductors 90 and 91 respectively attached (by brazing or the like) to the copper posts 76 and 77 near their inner ends. The distal ends of these conductors have holes for bolting to suitable electroconductive support members, not shown. To promote the dissipation of heat from the various copper posts 76 and 77, they are equipped, respectively, with two groups 92 and 93 of spaced metal cooling fins. The fins of each group have been separated by spacing rings 94 and attached to the copper posts by brazing or the like.

If desired, the diameter of the outer end of each copper post can be progressively reduced as the axial distance from a terminal conductor 90/91 increases. In an alternative arrangement, the cooling fins in each group can be oriented parallel to the axes of the copper posts and attached to the associated conductor, in which case the copper posts could be shortened to mere stubs protruding from the opposing faces of the conductors 90 and 91.

With forced-air cooling, the rectifier assembly illustrated in FIGS. 5–6 can continuously conduct 2,500 amperes (average forward current). This high-current assembly has all of the previously emphasized advantages of the first embodiment of my invention, and two more advantages of my balanced pressure assembly will now be readily apparent.

High contact pressure is applied *equally and normally to each of a plurality* of individual semiconductor rectifier devices by means of a single tie bolt in a relatively compact assembly of high current capacity. Those skilled in the art will appreciate that a substantially equal sharing of pressure is vital if balanced current division among paralleled devices is to be approached to a satisfactory degree.

Furthermore, my design is unusually *versatile* in that a large variety of different circuit configurations can be assembled from a relatively small number of basic components. The three embodiments already described and those to follow all utilize thyristors and/or diodes from just two commercial lines of standard, mass produced semiconductor devices.

Two further variants of my invention are incorporated in its next embodiment, illustrated in FIGS. 7, 7*a*, 8, and 9. This embodiment comprises a pair of inverse-parallel thyristors jointly mounted in a water cooled assembly to form a 1200-ampere (RMS) A-C switch. Both thyristors have been identified by the reference number 11, since they are duplicates of the semiconductor rectifier device of the same number used in FIGS. 1–3 and previously described. As is best seen in FIG. 7*a*, a first one of the two devices 11 is disposed mechanically between and electrically in series with a pair of axially aligned copper posts 100 and 101, and the second device 11 is disposed mechanically between and electrically in series with another pair of axially aligned copper posts 102 and 103. These two sets of aligned posts are parallel to one another and also parallel to a third set of aligned steel posts 104 and 105 between which a rigid spacer 30 is sandwiched.

As is best seen in FIGS. 7 and 9, the three sets of posts 100–101, 102–103, and 104–105 are symmetrically located in a tripodal arrangement. All three sets are axially compressed, whereby the copper posts are tightly clamped against the main electrodes 13 and 14 of the respective semiconductor devices 11, by pressure applying means that comprises a single tension member, preferably a steel tie rod 106 sheathed in insulation, that extends centrally among and parallel to these sets. One end of the tie bolt 106 is connected to the outer ends of the posts 101, 103, and 105 by means of a nut 36, a Belleville spring washer 37, and an insulating collar 41. The connection between the opposite end of the tie bolt and the posts 100, 102, and 104 is similar except that the insulating collar 41 has been omitted. Consequently the tie bolt 106 and both of its nuts 35 and 36 will be at the same electrical potential as the copper posts 100 and 102.

It will now be apparent that the balanced pressure applying arrangement of the FIGS. 7–9 embodiment of my invention is the same as that of the FIGS. 1–3 embodiment fully described hereinbefore. However, in FIGS. 7–9 two devices 11 are paralleled, and the takeoff means for connecting them to an external electric circuit and for mechanically mounting the whole assembly comprises a pair of hollow heat sinks 107 and 108 of electroconductive material, preferably copper. The outer ends of the copper posts 100 and 102 traverse the heat sink

107, and an arm **107*a* extending therefrom serves as a terminal conductor for these two posts. The outer ends of the copper posts 101 and 103 traverse the other heat sink 108, and an arm 108*a* extending from 108** serves as a terminal conductor for the latter posts.

In order to form an A-C switch, the two devices 11 in the FIG. 7*a* assembly have been inversely poled, whereby the terminal conductor **107*a* is connected, via the copper post 100, to the anode 13 of the first device and, via the post 102, to the cathode 14 of the other, while the terminal conductor 108*a* is connected, via the post 101, to the cathode 14 of the first device and, via post 103, to the anode 13 of the other. For proper electrical and thermal contact between the respective posts and the inversely poled devices 11, the opposing ends of the copper posts 100 and 101 are given the same configuration as the opposing ends, respectively, of the copper posts 20 and 21 previously described in connection with FIG. 2, whereas in FIGS. 7–9 the configuration of the inner end of the post 102 is the same as that of post 101 and the configuration of the inner end of the post 103 is the same as that of post 100. The coaxial connectors 58 for the gate leads to the gate electrodes 16 of the devices 11 are located on insulating bases 109 which, as shown in FIG. 9, are respectively mounted on the heat sinks 107 and 108. To conserve space, it may be desirable to omit the third set of aligned posts 104–105 and the insulating spacer 30 therebetween and to relocate the two sets of copper posts 100–101 and 102–103 on diametrically opposite sides of the tierod 106** in a symmetrical, pressure balancing arrangement. An oblong or elliptical spring washer can advantageously be used in this setting.

In order to maximize the current rating of this A-C switch, heat is dissipated from the copper posts 100–103, and hence from the semiconductor devices 11, by circulating water through both of the hollow heat sinks 107 and 108. Inside each heat sink there is an inlet 110 for cool water, a spiral duct 111 twice encircling one of the copper posts, a passage 112 to another spiral duct twice encircling the other copper post that is encased in the same heat sink, and an outlet 113. As can be seen in FIG. 8, the spiral duct 111 preferably comprises two annular grooves formed at different elevations in the periphery of a copper post, an opening for vertical communication between the two grooves, and a pair of plugs 114 for respectively blocking the grooves on opposite sides of this opening. Note that the diameter of each copper post is progressively reduced as the axial distance from the device 11 increases, whereby a greater surface area is exposed to the cooling water in the hotter region of the post.

Still other means for dissipating heat from the copper posts of my assembly will be obvious to those skilled in the art. If desired to copper posts could be short stubs protruding from massive water cooled heat sinks which themselves are compressed between these posts and the spring washers 37.

The versatility of my assembly will be even more fully appreciated by next considering the various permutations illustrated in FIGS. 10*a*–10*e*.

Figure 10A:
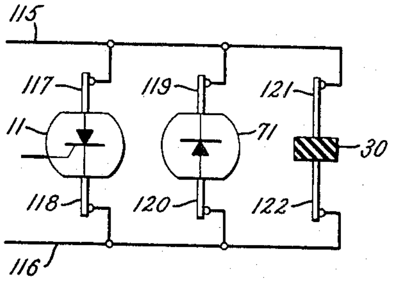

FIG. **10*a* illustrates a thyristor 11 and a "feedback" diode 71 connected in inverse-parallel relationship with each other between a pair of terminal conductors 115 and 116. In such an assembly the semiconductor thyristor 11 will be disposed in compression between aligned copper posts 117 and 118 with its anode in contact with the post 117 and its cathode in contact with the post 118, while the semiconductor diode 71 will be disposed in compression between aligned copper posts 119 and 120 with its cathode in contact with post 119 and its anode in contact with post 120. One terminal conductor 115 is attached to the copper posts 117 and 119, and the other conductor 116 is attached to the copper posts 118 and 120. As can be seen in FIG. 10*a*, the two sets of posts 117–118 and 119–120 are paralleled by another set of aligned thrust members 121 and 122 between which a rigid spacer 30** is compressed, and, as before, all three sets are axially compressed by means of a centrally located tension member whose opposite ends are mechanically connected thereto. The tension member has not been shown in this hybrid electrical-mechanical schematic diagram.

In one possible alternative of FIG. 10*a*, the two posts 119 and 120 could be part of a set of three or more mutually aligned copper posts between which two feedback diodes 71 are serially connected, with a conductor being attached to an intermediate post of this set in order to connect the common junction between the two diodes to an external electric circuit.

Figure 10B:
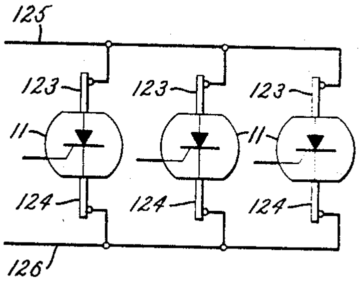

In FIG. 10*b* each of three separate semiconductor devices 11 is disposed between the opposing ends of the axially compressed copper posts 123–124 of a different one of three parallel sets of such posts, and hence all three devices are connected electrically in parallel between a pair of terminal conductors 125 and 126 attached to the first post 123 and to the second post 124, respectively, of each set. As an interesting variant, this high-current assembly can be made coaxial by utilizing the central tension member (not shown) as part of the takeoff means. For this purpose a suitably electroconductive tension member will be used, and no electrical insulation will be interposed in the connection between its lower end and the copper posts 124 (as is true in the FIGS. 7–9 embodiment, supra). The upper end of the tension member will then serve as the terminal conductor 126.

Figure 10C:
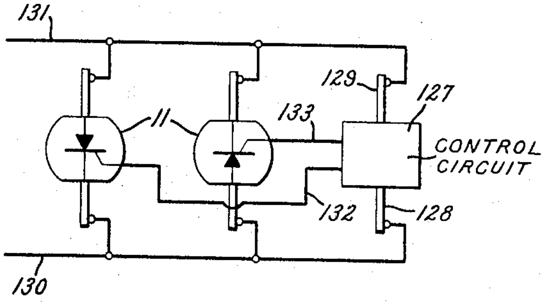

The FIG. 10*c* assembly is an A-C switch (as in FIG. 7*a*) provided with an integral control circuit for the pair of thyristors 11. The control circuit is located in a housing 127 which, in lieu of a spacer 30, is disposed between the opposing ends of the set of axially aligned posts 128 and 129. The posts 128 and 129 are respectively connected to the terminal conductors 130 and 131 between which the two thyristors are inversely paralleled, and therefore these posts can serve as gate-signal references for the respective thyristors. Furthermore, the potential difference that will exist between the posts 128 and 129 during intervals when neither thyristor is conducting can be utilized by the control circuit as a source of power. The control circuit is electrically connected to the gate electrodes of the respective thyristors 11 by way of gate leads 132 and 133, and its operation may be supervised or controlled by remote means suitably coupled thereto.

Figure 10E:
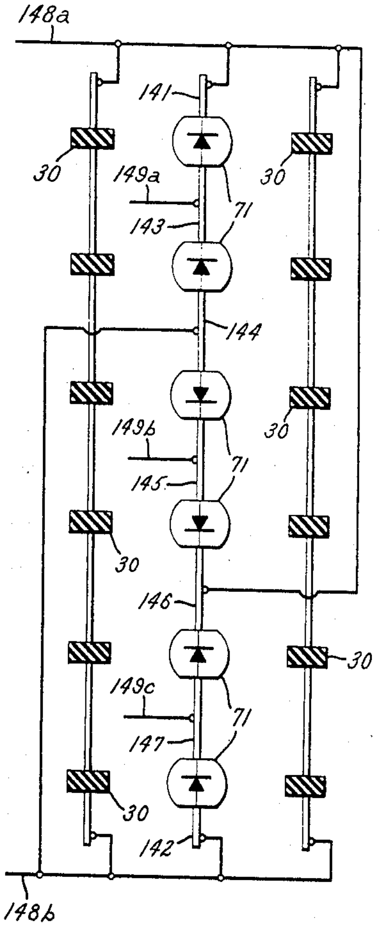
Figure 10D:
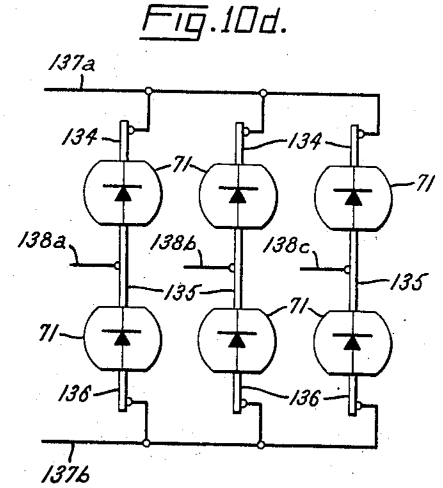

FIG. 10*d* illustrates an assembly of six semi-conductor devices 71 arranged in a 3-phase rectifier configuration. This assembly comprises three parallel sets of first, second, and third axially aligned posts 134, 135, and 136, respectively. The devices 71 are respectively disposed between opposing ends of the posts of the three sets as shown. The takeoff means comprises a first D-C terminal conductor 137*a* connected to the first post 134 of each set (and hence to the cathodes of three of the devices 71), a second D-C conductor 137*b* connected to the third post 136 of each set (and hence to the anodes of the other three devices 71), and first, second, and third A-C conductors 138*a*, 138*b*, and 138*c* connected to the middle or third posts 135 of the three sets, respectively.

Alternatively, a 3-phase bridge rectifier can be arranged in the manner shown in FIG. 10*e*. This assembly comprises first and second spaced-apart, axially aligned copper posts 141 and 142 between which third, fourth, fifth, sixth and seventh copper posts 143, 144, 145, 146, and 147 are sequentially disposed. Six semiconductor devices 71 are stacked between the respectively adjacent copper posts as shown. The set of copper posts 141–147 is paralleled by two corresponding sets of aligned steel posts that are interconnected by means of a plurality of insulating spacers 30, and all of the posts are axially compressed by a centrally located long tie bolt (not shown). The takeoff means for this assembly comprises a first D-C terminal conductor 148*a* connected to both the first and the sixth copper posts 141 and 146 (and hence to the cathodes of three of the devices 71), a second D-C terminal conductor 148*b* connected to both the second and the fourth copper posts 142 and 144 (and hence to the anodes of the other three devices 71), and first, second and third A-C terminal conductors 149*a*, 149*b* and 149*c* respectively connected to the third, fifth and seventh copper posts 143, 145 and 147.

While I have shown and described many forms of my invention by way of illustration, still other modifications will undoubtedly occur to those skilled in the art. For example, a steel post in combination with two copper posts could form a set of mutually aligned metal posts if desired, with a semiconductor device being disposed between the copper posts of this set, an insulating spacer being disposed between the steel post and the copper post adjacent thereto, and said adjacent copper post being furnished with suitable takeoff means. I therefore contemplate by the claims that conclude this specification to cover all such modifications as fall within the true spirit and scope of the invention.

What I claim as new and desire to secure by Letters Patent of the United States is:

1. In a semiconductor rectifier assembly:

(a) two or more semiconductor rectifier devices each including a sealed housing and a pair of main electrodes having external contact surfaces on opposite sides of the housing;

(b) three or more parallel sets of first and second axially aligned metal posts, the first and second posts of each set having opposing ends terminated by facing surfaces each of which is intersected at approximately a right angle by the common axis of the set, each of said devices being disposed between the opposing ends of a different one of said sets with the facing surfaces of said opposing ends respectively adjoining the contact surfaces of the interposed device;

(c) the facing surfaces of said opposing ends between which any one of said devices is disposed being substantially parallel to the contact surfaces that they respectively adjoin, whereby each of said contact surfaces is contiguous with a facing surface over a relatively broad area; and (d) pressure applying means for axially compressing said posts, said means including a tension member extending centrally among and parallel to said sets of posts and having opposite ends mechanically connected to the respective posts of each of said sets.

2. The assembly of claim 1 in which said pressure applying means comprises:

(i) an elongated tie bolt extending centrally among and parallel to said sets of posts, (ii) first means connected between one end of the tie bolt and a corresponding end of the first post of each set of posts for transmitting an axial thrust to the first post of each set, (iii) second means for connecting the other end of said bolt to the second post of each set, and (iv) electric insulating means included in at least one of said first and second means for preventing short-circuiting of said first and second posts by the tie bolt.

3. The assembly of claim 2 in which said first means comprises a spring washer having a crown that is fastened to said one end of the tie bolt and having a rim that overlays the axial center of said corresponding end of the first post of each of said sets of posts.

4. The assembly of claim 1 in which said posts are furnished with takeoff means for connecting said devices in parallel to an external electric circuit, said takeoff means comprising a first conductor connected to the first post of each of said sets of posts and a second conductor connected to the second post of each of said sets.

5. The assembly of claim 4 in which there are first and second semiconductor rectifier devices, the main electrodes of each of said devices are anode and cathode, respectively, and the devices are inversely poled so that said first conductor is connected to the anode of said first device and to the cathode of said second device, and said second conductor is connected to the cathode of said first device and to the anode of said second device.

6. The assembly of claim 1 in which said posts are furnished with means for mechanically mounting the assembly and for electrically connecting said plurality of devices in parallel to an external electric circuit.

7. The assembly of claim 1 in which at least one spacer of electric insulating material is disposed between the opposing ends of at least one of said sets of posts.

8. The assembly of claim 1 in which each of the posts between which any one of the semiconductor devices is disposed is equipped with heat dissipating means for enhancing the cooling thereof.

9. The assembly of claim 1 in which there are only three parallel sets of first and second axially aligned metal posts.

10. The assembly of claim 1 in which said tension member is electroconductive and in which the assembly includes:

(e) means for electrically interconnecting said member and the first post of each of said sets of posts;
(f) electric insulating material interposed between the second post of each of said sets and the end of said member which is mechanically connected to the second posts; and
(g) takeoff means comprising said end of said member and a conductor connected to the second posts of each of said sets.

11. The assembly of claim 1 in which at least one of said semiconductor rectifier devices is a thyristor that includes a gate electrode, and in which a control circuit is provided for said thyristor, said control circuit being electrically connected to said gate electrode and being located in a housing disposed between the opposing ends of the first and second posts of a predetermined set of posts.

12. In a semiconductor rectifier assembly:

(a) a plurality of parallel sets of first, second, and third axially aligned metal posts the second of which is disposed between the first and third, the first and second posts of each set having opposing ends terminated by space-apart surfaces that are parallel to one another and perpendicular to the common axis of the set, and the second and third posts of each set having opposing ends terminated by spaced-apart surfaces that are also parallel to one another and perpendicular to said common axis;
(b) a plurality of semiconductor rectifier devices each of which includes a sealed housing and a pair of main electrodes having external contact surfaces on opposite sides of the housing, one of said devices being disposed between the opposing ends of the first and second posts of one of said sets of posts with its contact surfaces respectively adjoining the parallel surfaces of said opposing ends, and another of said devices being disposed between the opposing ends of the second and third posts of said one set with its contact surfaces respectively adjoining the parallel surfaces of the last-mentioned opposing ends; and
(c) pressure applying means for axially compressing said posts, said means including an elongated tension member extending centrally among and parallel to said sets of posts and having opposite ends mechanically connected to the first and third posts of each of said sets.

13. The assembly of claim 12 in which a plurality of spaced metal cooling fins are attached to each of the first, second, and third posts of said one set of posts.

14. The assembly of claim 12 in which there are three parallel sets of first, second, and third axially aligned metal posts and six semiconductor rectifier devices respectively disposed between opposing ends of the posts of said three sets, and in which said posts are furnished with takeoff means for connecting said six devices in a three-phase bridge rectifier configuration, said takeoff means comprising a first D-C conductor connected to the first post of each of said sets, a second D-C conductor connected to the third posts of each of said sets, and first, second, and third A-C conductors connected to the second posts of said three sets, respectively.

15. In a semiconductor rectifier assembly:

(a) three parallel sets of first and second spaced-apart, axially aligned metal posts, at least one of said sets including at least a third metal post in spaced, axial alignment between the first and second posts of that set;
(b) first and second semiconductor rectifier devices, said first device being disposed between the first and third posts of said one set of posts and said second device being disposed between the second and third posts of said one set;
(c) at least one pair of spacers of electric insulating material respectively disposed between the first and second posts of the other two sets of posts; and
(d) pressure applying means for axially compressing said posts, said means including an elongated tension member extending centrally among and parallel to said three sets of posts and having opposite ends respectively connected to the first and second posts of each of said sets, and electric insulating means for preventing short circuiting of the first and second posts of said one set by said tension member.

16. The assembly of claim 15 in which there is takeoff means for connecting said semiconductor devices to an external electric circuit, said takeoff means comprising a first conductor connected to the first posts of each of said three sets of posts, a second conductor connected to the second posts of each of said sets, and a third conductor connected to said third post of said one set.

17. In a semiconductor rectifier assembly:

(a) a plurality of parallel sets of first and second spaced-apart metal posts disposed in axial alignment with each other;
(b) a plurality of interconnection means disposed mechanically between the respective first and second posts of said sets, at least one of said interconnection means comprising a semiconductor device connected electrically in series with the posts between which it is disposed; and
(c) pressure applying means for axially compressing all of said posts, said pressure applying means comprising
  (i) a tension member having a longitudinal axis extending parallel to said sets of posts and centered with respect thereto,
  (ii) a spring washer having a crown fastened to the tension member at one end thereof and having a rim that overlays the axial center of a corresponding end of the first post of each of said sets of posts, whereby an axial thrust is transmitted to the first post of each set, and
  (iii) means for mechanically connecting the other end of said member to the second post of each set.

18. The assembly of claim 17 in which at least one of said interconnection means comprises at least one spacer of electric insulating material.

19. The assembly of claim 17 in which said corresponding end of the first post of each of said sets is capped with a layer of electric insulation and a flat hard metal cap against which the rim of said washer bears.

20. In a semiconductor rectifier assembly:

(a) a plurality of parallel sets of first and second spaced-apart metal members disposed in alignment with each other;

(b) a plurality of interconnection means disposed mechanically between and in alignment with the respective first and second members of said sets, at least one of said interconnection means comprising a semiconductor rectifier device connected electrically in series with the members between which it is disposed;

(c) takeoff means attached to the first and second aligned members between which said device is disposed for connecting the same to an external electric circuit;

(d) two groups of spaced metal cooling fins attached respectively, to the members between which said device is disposed; and (e) pressure applying means for axially compressing said aligned members, said means including a tension member extending centrally among and parallel to said sets of members and having opposite ends mechanically connected to the respective members of each of said sets.

21. The assembly of claim 20 in which an air baffle of insulating material is installed between said groups of cooling fins, said baffle being arranged to block air circulation in a predetermined space between but not contiguous to said groups, said semiconductor device being located in said space.

22. In a semiconductor rectifier assembly:

(a) first and second spaced-apart metal members disposed in alignment with each other;

(b) a semiconductor device having an anode and a cathode, said device being sandwiched between said aligned members with its anode and cathode conductively coupled to the first and second members, respectively;

(c) means for connecting said members to an external electric circuit;

(d) at least one pillar mechanically but not electrically disposed in parallel with said aligned members;

(e) pressure applying means for compressing said pillar and said members, said pressure applying means including a tension member extending centrally between and parallel to said pillar and said aligned members, said tension member having one end connected to said first member and to a corresponding end of said pillar and having its other end connected to said second member and to the other end of said pillar, whereby said device is firmly clamped between said first and second members; and (f) electric insulating material interposed in the connection between said tension member and at least one of said first and second members.

23. The assembly of claim 22 in which said pillar comprises third and fourth spaced-apart, aligned metal members between which a spacer of electric insulating material is sandwiched.

24. The assembly of claim 22 in which each of said first and second metal members is equipped with heat dissipating means for enhancing the cooling thereof.

25. The assembly of claim 24 in which said heat dissipating means comprises a plurality of spaced metal cooling fins.

26. The assembly of claim 22 in which said means for connecting said aligned members to an external electric circuit is also arranged for mechanically mounting the assembly.

27. The assembly of claim 22 in which said semiconductor device includes a sealed housing on opposite sides of which external flat contact surfaces for said anode and said cathode are respectively formed, and in which opposing ends of said aligned members are terminated by flat contact surfaces that are parallel to one another and perpendicular to the common centerline of said members, the latter surfaces being firmly clamped against the respective contact surfaces of said device.

28. The assembly of claim 22 in which a third metal member is disposed in spaced relation to said second member and in mutual alignment with both of said first and second members, in which a second semiconductor device having an anode and a cathode is sandwiched between said second and third members with its anode and cathode conductively coupled to the second and third members, respectively, and in which the connection between said second member and said other end of said tension member is made by way of said third member and said second device.

29. The assembly of claim 22 in which there is a pair of pillars mechanically but not electrically disposed in parallel with said aligned members, said one end of said tension member being connected to corresponding ends of said pair of pillars and said other end of the tension member being connected to the other ends of both pillars.

30. In a semiconductor rectifier assembly:

(a) a plurality of parallel sets of spaced-apart thrust members disposed in alignment with one another, the thrust members of at least one of said sets comprising two electroconductive posts having opposing ends terminated by facing contact surfaces;

(b) a plurality of interconnection means respectively disposed in the gaps between the spaced-apart thrust members of said parallel sets, at least one of said interconnection means comprising a semiconductor rectifier device that includes a sealed housing and a pair of main electrodes on opposite sides of the housing, said device being disposed in the gap between the opposing ends of said posts with its main electrodes compressed between said facing contact surfaces;

(c) yieldable means located between said posts and said housing for mechanically stabilizing said housing while said electrodes are compresed between said contact surfaces; and (d) pressure applying means connected to the spaced-apart thrust members for clamping them against the respective interconnection means.

31. In a semiconductor rectifier assembly:

(a) a plurality of parallel sets of spaced-apart thrust members disposed in alignment with one another, the thrust members of at least one of said sets being made of electroconductive material and having facing contact surfaces;

(b) a plurality of interconnected means respectively disposed in the gaps between the spaced-apart thrust members of said parallel sets, at least one of said interconnection means comprising a semiconductor rectifier device that includes an insulating sleeve joined at opposite ends to a pair of main electrodes which are compressed between facing contact surfaces of the thrust members of said one set;

(c) yieldable means located between said sleeve and the respective thrust members of said one set for closing the gaps therebetween; and (d) pressure applying means connected to the spaced-apart thust members for clamping them against the respective interconnection means.

32. In a semiconductor rectifier assembly;

(a) a semiconductor device comprising a pair of main electrodes, a semiconductor body disposed mechanically between and electrically in series with said electrodes, an insulating sleeve, and means for joining said electrodes to opposite ends of said sleeve to form a sealed housing for said body;

(b) means for pressing aid main electrodes against the interposed semiconductor body comprising a set of spaced-apart electroconductive thrust members having facing contact surfaces, said device being disposed with its main electrodes between the facing contact surfaces of said thrust members but with its insulating sleeve spaced therefrom; and (c) means comprising a pair of yieldable washers located in gaps between said sleeve and the respective thrust members for closing said gaps.

References Cited

UNITED STATES PATENTS

| | | | |
|---|---|---|---|
| 1,862,936 | 6/1932 | Lissman | 317—238 |
| 2,153,434 | 4/1939 | Schmikus | 317—234 X |
| 2,745,044 | 5/1956 | Lingel | 317—234 |
| 2,803,791 | 8/1957 | Van Amstel et al. | 317—234 |
| 2,933,663 | 4/1960 | Connell | 317—234 |
| 3,192,454 | 6/1965 | Rosenheinrich et al. | 317—234 |
| 3,238,425 | 3/1966 | Geyer | 317—234 |
| 3,280,389 | 10/1966 | Martin | 317—234 |

JOHN W. HUCKERT, Primary Examiner

R. F. POLISSACK, Assistant Examiner

U.S. Cl. X.R.

174—15, 52; 317—100.235